United States Patent

Addeo

[15] 3,692,938

[45] Sept. 19, 1972

[54] ARRANGEMENT FOR VISUALLY INFORMING STATIONS OF CONDITIONS ENCOUNTERED DURING ESTABLISHMENT OF A CALL

[72] Inventor: Eric John Addeo, Long Valley, N.J.

[73] Assignee: Bell Telephone Laboratories, Incorporated, Murray Hill, N.J.

[22] Filed: Oct. 15, 1970

[21] Appl. No.: 81,003

[52] U.S. Cl. ....................179/2 TV
[51] Int. Cl. ....................H04m 11/08
[58] Field of Search ..............179/2 TV, 18 H, 84 R; 178/DIG. 13

[56] References Cited

UNITED STATES PATENTS 3,502,812 3/1970 Litofsky ..................179/2 TV

*Primary Examiner*—Kathleen H. Claffy
*Assistant Examiner*—Thomas D'Amico
*Attorney*—R. J. Guenther and James Warren Falk

[57] ABSTRACT

An audio-video switching system is provided with a control circuit operable to detect the various conditions encountered during the establishment of calling connections through the system and in response to each such condition to select a corresponding one of a plurality of video image generators and to associate such generator with the communication path extending to the corresponding calling station so as to visually inform the calling station of the status of the call.

7 Claims, 4 Drawing Figures

INVENTOR
E. J. ADDEO
BY Brendan A. Ward
ATTORNEY

ARRANGEMENT FOR VISUALLY INFORMING STATIONS OF CONDITIONS ENCOUNTERED DURING ESTABLISHMENT OF A CALL

BACKGROUND OF THE INVENTION

1. Field of the Invention

This invention pertains to communication systems operable to provide visual communication facilities for associated stations. More particularly this invention pertains to arrangements within such systems operable to provide visual call progress indications to such stations.

2. Description of the Prior Art

In the field of communications technology, the ultimate goal has been to duplicate the conditions present in face-to-face communication. Thus, continued development of communication systems has resulted in the evolution of the telegraph with its use of the electrically coded signal to convey information, through the telephone with its faithful reproduction of the spoken word, to the present day video telephone systems which permit both audio and visual transmission of information between stations. This most recent improvement more nearly attains the long sought goal of duplicating face-to-face communication.

As a result of the aforesaid rapid and significant improvement of communication systems, substantial reliance has been placed thereon by every segment of modern society. This demand for service has resulted in the development of switching systems operable to interconnect the multiplicity of stations served thereby in response to relatively simple control signals generated by such stations. Although such control signals are simple, the switching systems are inherently complex. This is due in part to the fact that economy is and continues to be a major design objective in such systems. Thus, for example, in view of the magnitude of the number of possible communication paths which must be available to any arbitrarily selected station, the equipment operable to provide such paths has been minimized in view of the well-known proposition that all stations do not require service at all times. Thus common control switching systems are designed to provide prompt service to all stations but with relatively minor delays during peak traffic periods. This results in maximum efficiency and minimum inconvenience for the subscriber station which is advised by suitable predetermined signals (i.e., overflow tone) of the existence of conditions which may prevent immediate completion of a particular call.

In addition to the foregoing, many special service station features have recently been developed to render communication service more convenient and more flexible. Such features result in conditions occurring within the switching system of which the calling station must also be apprised by a suitable signal. Such signals must, of course, be distinct from the well-known line busy, overflow, etc.

From the foregoing, it will be recognized that the function of the switching system is multifaceted in nature. The principal function is to interconnect calling and called stations in accordance with control signals generated by such stations. Thus, the principal function is more simply recognized as providing communication between stations served by the switching system. However, in addition, it is also apparent that a subsidiary function of the switching system is to provide communication from itself to associated stations in order to inform such stations of the status of calling connections in certain instances.

The substantial improvement in switching systems in employing the most recent technology and applying it to its principal function of providing communication between stations has been extremely beneficial. However, the same level of achievement has not been attained with respect to the subsidiary function of the switching system in its communication with associated stations. Yet, the ever increasing sophistication of the switching system in conjunction with the increasing number of possible call conditions has placed a substantial burden upon this subsidiary function.

Although arrangements have been provided, for example, to visually inform a deaf video-telephone subscriber by raster changes at the calling video set that specified calling conditions have been encountered, such arrangements, though beneficial, are but isolated solutions to individual calling problems. Such arrangements do not contribute to the more generic problem of the need for all switching systems to more adequately communicate with all subscribers regarding all calling conditions. Thus, improvement is necessary in the communication which of necessity extends between the switching system and the associated station.

This particular deficiency of the prior art is of even greater significance when it is recognized that the number of distinct signals which may be transmitted audibly are relatively limited by virtue of the available number of possible permutations of distinct sounds coupled with the fact that the multiplicity of audible signals often confuses rather than informs a calling party. This deficiency is not present where such conditions are visually presented since each visual presentation may be of itself unique and does not require prior definition.

Thus, a need exists in the art for improvement in the ability of a communication system to communicate with associated stations. A need exists for such an arrangement within switching systems which is operable to provide visual as well as audible call progress indications to a calling station. In addition, a need exists in the art for such an arrangement which may be economically and expeditiously provided in existing switching systems.

SUMMARY OF THE INVENTION

The foregoing and other objects, features, and advantages are attained in accordance with an illustrative embodiment comprising a communication system operable to provide audio and video communication paths between calling and called stations. The system of the embodiment includes a Private Branch Exchange (PBX) having an attendant position from which incoming calls to the PBX may be extended to respective PBX video telephone stations. The establishment of a calling connection from a calling station to the PBX is accomplished through the serial insertion of a related video trunk and audio trunk in the respective video and audio linkage paths extending between the stations.

A control circuit is provided at the PBX which is associated with each of the video and audio trunks incoming to the PBX. The control circuit is operable to sense the various calling conditions encountered during the establishment of a calling connection to the PBX as manifested by the state of the associated supervisory control apparatus within the audio trunk. The control circuit is further operable, in response to the detection of certain calling conditions, to connect one of a plurality of video image generators to the associated video trunk to thereby provide visual information to the calling station as determined by the particular condition encountered. When the condition no longer prevails, the control circuit is arranged to detect and to recognize this fact and to thereupon permit the associated video linkage path to transmit information in the conventional manner. The control circuit continues to monitor each calling connection. As other calling conditions are encountered a suitable video image generator as determined by the specific calling condition thereupon detected is connected to the respective video linkage paths.

In accordance with one feature of my invention a communication system is arranged to communicate visually with associated stations so as to advise such stations of various calling conditions encountered during the progress of a call.

It is a further feature of my invention that a communication system is arranged to detect and recognize the various conditions encountered during the establishment of a calling connection and to select suitable visual information transmitting apparatus and to associate such apparatus with a communication path extending to a calling station so as to continuously provide information to the calling station as to the status of the call.

BRIEF DESCRIPTION OF THE DRAWING

The foregoing objects, features, and advantages as well as others of my invention will be more apparent from the following description of the drawing in which.

Figure 2:
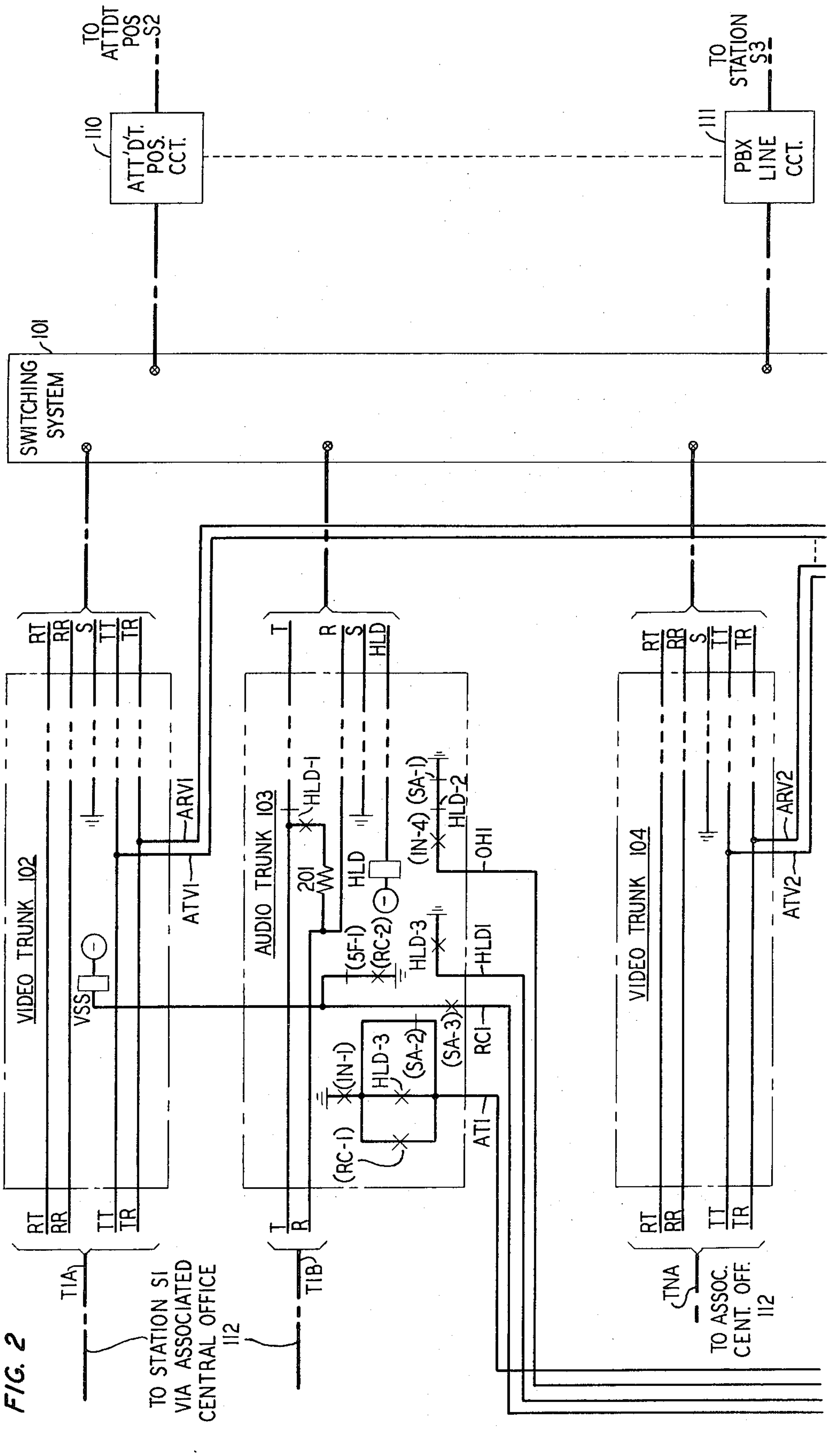
FIGS. 2 and 3 are combined schematic and block diagrams showing in more detail the interrelation of the components of the exemplary embodiment.
Figure 3:
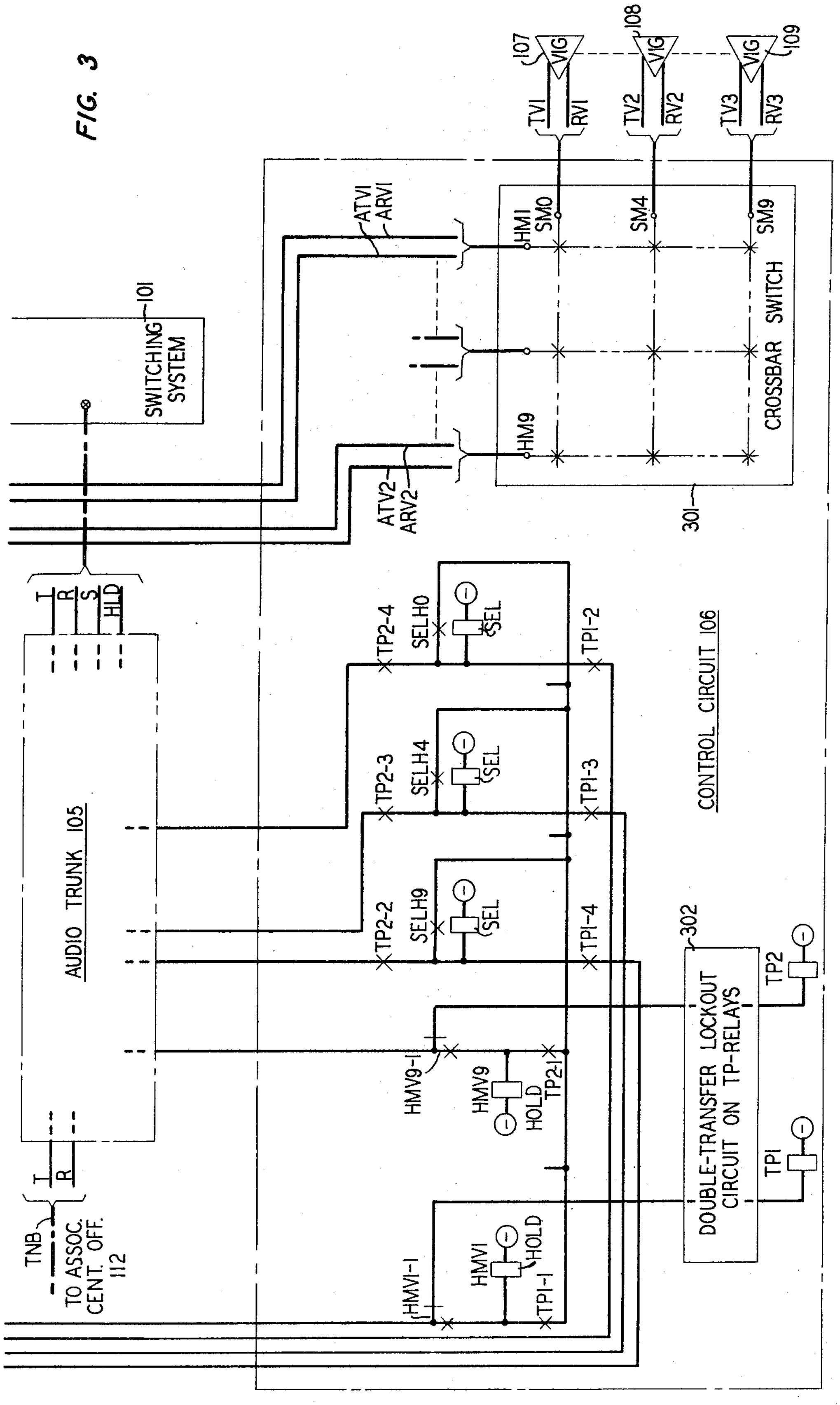

It will be noted that FIGS. 2 and 3 employ a type of notation referred to as "detached-contact" in which an X, shown intersecting a conductor, represents a normally open contact of a relay, and a bar, shown intersecting a conductor at right angles, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the *American Institute of Electrical Engineers Transactions, Communications and Electronics*, Volume 74, pages 505–513.

In the illustrative embodiment the switching system comprises a calling central office A (hereinafter referred to as central office 112) and a called video and audio PBX switching system B. It is intended that central office 112 be substantially identical to the combined wideband-voiceband switching system set forth in the copending application of C. W. Haas, Jr., Ser. No. 43,079, filed June 3, 1970. (See also copending application of M. C. Van Fossen et al., Ser. No. 9,691, filed Feb. 9, 1970.) Thus central office 112 incorporates two independently controlled crossbar switching networks respectively referred to as an audio network and a wideband network. The audio network is used for interconnecting telephone stations for voice communication, while the wideband network is used for providing wideband service, such as that required for video signals for visual communication. Thus, when a calling connection is initiated which is to provide both audio and video communication features the respective communication paths are concurrently established through both networks.

It is also intended that PBX switching system B (hereinafter referred to as PBX 101) may, except as set forth hereinafter, be substantially identical to that set forth in the H. P. Anderson et al. application, Ser. No. 832,292, filed June 11, 1969 now U. S. Pat. No. 3,612,767. Thus, both central office 112 and PBX 101 each comprise separate audio switching networks and separate video switching networks, each of which are operable to provide the corresponding type of communication. Accordingly, the respective audio networks upon being enabled are effective to provide a two-wire communication path extending between the station telephone subsets of the calling and called parties. In similar fashion, the respective video networks when enabled are operable to provide two two-wire communication paths (one for transmitting video and one for receiving video) between respective video sets at calling and called stations.

Figures 1, 4:
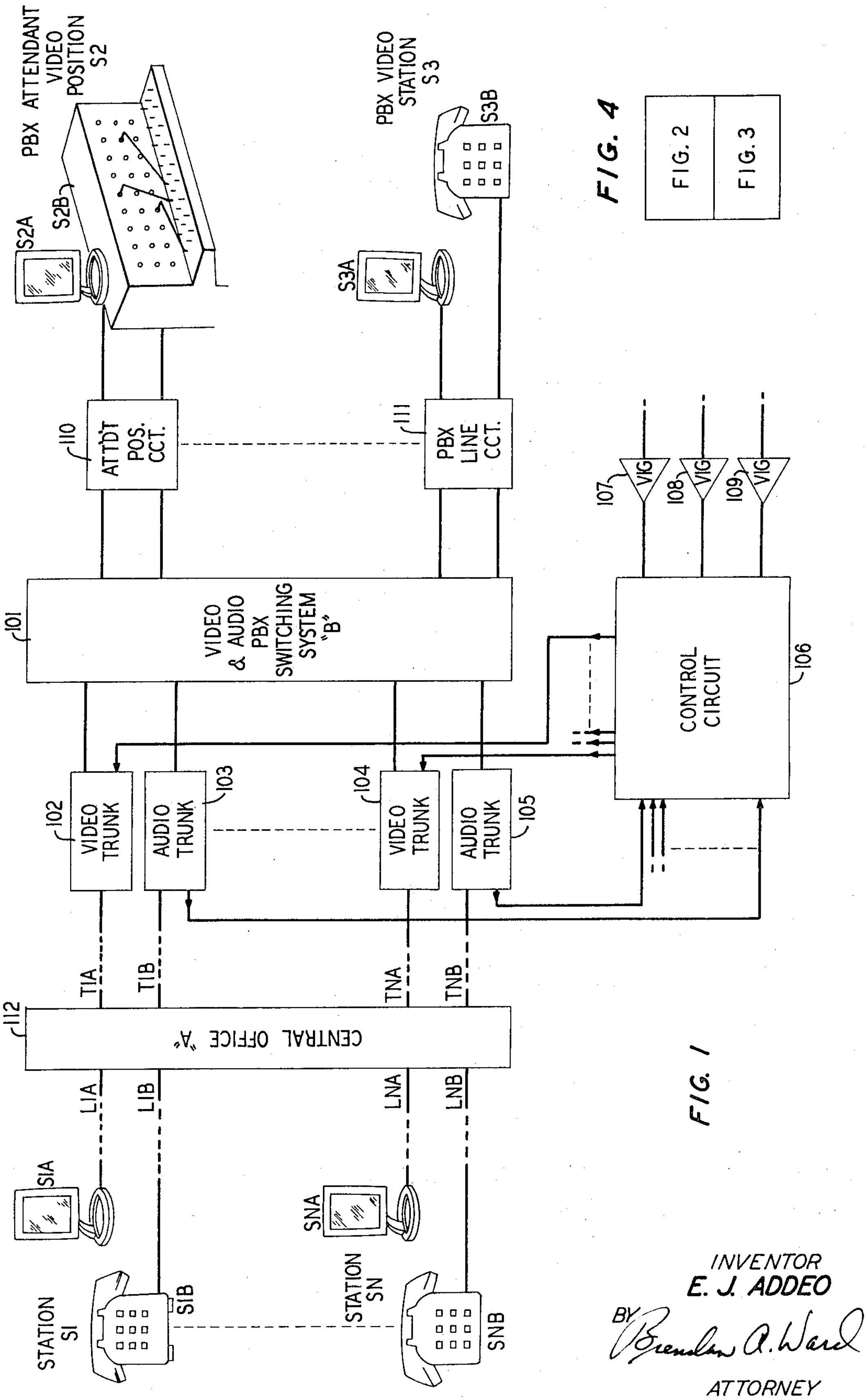
FIG. 1 is a block diagram showing the interrelation of the various components of the illustrative embodiment.
FIG. 4 shows the manner in which the other figures should be arranged.

Except as noted hereinafter, it is intended that the video and audio trunks shown in FIG. 1 are substantially identical to those disclosed in the earlier cited Haas application. It is to be understood, however, that the present invention is not limited to use with equipment of this type or the specific switching systems are aforesaid but may in fact be utilized with other types of switching systems and associated equipment.

The invention described herein is particularly concerned with apparatus in control circuit 106 which is represented by the block shown with heavy lines in FIG. 1, in order to distinguish it from the prior art equipment units which are neither shown nor described in detail except where necessary for a complete understanding of the invention. For a more complete understanding of the construction of the prior art equipment units the earlier cited Haas or Anderson et al. applications may be consulted.

GENERAL DESCRIPTION

Referring now to FIG. 1, it is believed that a general understanding of the illustrative embodiment will be facilitated by a brief description of the component elements of the invention shown in this figure. As earlier noted, central office 112 is substantially identical to the video and audio switching network arrangement set forth in the earlier cited Haas application. Thus, central office 112 comprises a series of switching network stages and associated common control equipment (not shown) operable to provide communication paths for video and audio signals to and from stations associated with the central office to trunk circuits (not shown) which connect to other switching systems such as PBX 101. It is intended that video trunks 102 and 104 are substantially identical to each other and are of the two-way type set forth in detail in the cited Haas application. In similar fashion, audio trunks 103 and 105 are also identical and of the two-way type set forth in detail in the cited Haas application. In the instant embodiment, these trunks have their control apparatus located in PBX 101 and each is associated with the equivalent outgoing trunk (not shown) in Central Office 112. From that which is contained hereinafter, it will be apparent that in fact many other trunks to and from PBX 101 would be provided as determined by the traffic and community of interest considerations of the PBX.

As also noted earlier herein, it is intended that PBX 101 shall be a system of the type set forth in the earlier cited Anderson et al. application. Thus, PBX 101 is operable to provide independent but related audio and video linkage paths from stations served by the PBX to calling and called trunks associated with the PBX. In this regard, PBX line circuit 111 may comprise any number of configurations well known in the art operable to perform the conventional supervisory functions associated with the active and inactive status of PBX video station S3.

Attendant position circuit 110, which is associated with PBX attendant position S2, may comprise any number of configurations well known in the art, such as set forth in the cited Anderson et al., application, which is operable to permit the attendant position to receive incoming calls, to place such calls on hold and to extend such calls through to stations served by the PBX.

Video image generators 107, 108, and 109 may comprise any number of circuit configurations well known in the art operable to impress a video signal on a communications path associated therewith. In the instant embodiment it is intended that each of the video image generators will provide a constant output constituting a video signal which when received by an associated video receiver is manifested as a single statement of information. However, it will be obvious from that which is contained hereinafter, that the information transmitted by any of the video image generators may instead constitute any arbitrarily preselected visual scenes of varying and dynamic nature.

Control circuit 106 comprises apparatus which is operatively associated with each of the audio and video trunk circuits of PBX 101 and which is effective to detect the various calling conditions which may be encountered during the progress of an incoming or outgoing call. As will be more apparent subsequently, control circuit 106 is also operable in response to detection of such call conditions to associate a selected video image generator with a selected video trunk so as to advise the calling station currently associated with that video trunk of the nature and extent of the calling condition which has been encountered.

Proceeding now with the description, we shall assume that station S1 in central office 112 directs a calling connection to PBX 101. Accordingly, in a manner known in the art and as set forth in detail in the earlier cited Haas application, a linkage path is established through central office 112 from video subset S1A, through line L1A, and the network and trunk circuit (not shown) of central office 112 to conductors T1A, and via conductors T1A to incoming video trunk 102 in PBX 101. In similar fashion, a communications path is concurrently established from telephone subset S1B, via line L1B through the network and trunk circuit (not shown) of central office 112 to conductors T1B, and via conductors T1B to incoming audio trunk 103 in PBX 101. As will be apparent from that which is contained hereinafter, control circuit 106 recognizes the enabled state of audio trunk 103. In response thereto, control circuit 106 establishes a connecting path from video image generator 107 through to video trunk 102 to thereby transmit back to the calling station the fact that the calling station has reached the "ABC Manufacturing Co." The incoming call to PBX 101 progresses in the normal fashion and the attendant position S2 is alerted to the existence of the incoming connection. Accordingly, the attendant answers the call by associating the attendant position circuit with incoming video trunk 102 and audio trunk 103. Control circuit 106 detects answer of the calling connection by the PBX attendant and releases video image generator 107 from its association with video trunk 102. At this point in the connection, a continuous video and audio path exists between station S1 and PBX attendant position S2. Thus, communication may ensue in a visual and audible manner between the parties to the connection.

We shall now assume that the attendant at position S2 desires to place the incoming call on hold. Upon operating the hold key (not shown) in attendant position circuit 110, an electrical holding bridge is placed across the tip and ring conductors (not shown) of audio trunk 102 to maintain the existing connection during the hold period. Control circuit 106 is arranged to detect the hold status of audio trunk 103 and to immediately connect video image generator 108 to video trunk 102 at this time to thereby transmit a video signal which results in a visual presentation at video subset S1A in the following form: "Your call has been placed on hold. The attendant will assist you momentarily."

We shall further assume that the attendant shortly thereafter removes the hold condition and thereby reestablishes the audio and video communication paths between station S1 and attendant position S2. Control circuit 106 is arranged to detect this fact and to release the connection between video image generator 108 and video trunk 102. We shall further assume that in a manner well known in the art the attendant at position S2 takes the necessary steps to extend the calling connection through to PBX video station S3. The attendant position thereupon releases and ringing potential is impressed upon the transmission path extending to video station S3 to alert that station to the existence of the incoming call. Control circuit 106 is arranged to recognize that the call is in the process of being extended to a called station and to thereupon associate video image generator 109 with video trunk 102. Video image generator 109 is arranged to transmit a video signal effective to cause a visual presentation at video subset S1A of the following statement "Your party is being signaled; one moment please." Upon the subscriber at station S3 answering the incoming call, control circuit 106 is operable to detect this fact and to thereupon disassociate video image generator 109 from video trunk 102. Thus, at this point in time, a continuous audio and video communication path extends between station S1 and PBX station S3, and visual and audible communication between the parties may ensue.

DETAILED DESCRIPTION

This section will describe in detail the functioning of the exemplary embodiment. Prior to commencing the description it is believed that a brief explanation of FIGS. 2 and 3 of the drawing will assist in an understanding thereof. As noted earlier herein the structure of the components of the exemplary embodiment are substantially identical to that set forth in the earlier cited Haas disclosure. In order to simplify the instant drawing, apparatus which is shown in detail in the Haas application is not repeated herein; rather, to facilitate an understanding of the illustrative embodiment such apparatus is enclosed with parenthesis in order to indicate that, where desired, more detailed information as to the associated circuit path may be found in the Haas application. In order to further simplify the drawing, each relay contact is identified by reciting the functional designation of the associated control winding succeeded by a dash and the identifying digit for the particular contact.

FIG. 3 shows the components of control circuit 106 including crossbar switch 301. This switch may comprise any number of crossbar switch configurations well known in the art such that in response to the enabling of a select magnet associated with a selected horizontal level, in conjunction with the subsequent operation of a hold magnet associated with a vertical unit, an intersecting crosspoint comprising at least two make contacts are closed to thereby interconnect circuits appearing on the associated horizontal level and vertical unit, respectively. Thus, in the instant embodiment it is intended that crossbar switch 301 shall comprise a 10 vertical — 10 horizontal (100 point) two-wire crossbar switch. Each vertical unit, such as HM1, is associated with a predetermined video trunk of PBX 101. Thus, for example vertical unit HM1 of crossbar switch 301 has terminated thereon conductors ATV1 and ARV1 which extend to the TT and TR transmit leads of video trunk 102. In similar fashion, vertical unit HM9 has two conductors designated ATV2 and ARV2 which extend to the TT and TR transmit leads of video trunk 104. Although not shown, it is intended that other video trunks of PBX 101 would be similarly connected to the remaining vertical units of crossbar switch 301.

Horizontal units SM0, SM4, and SM9 of crossbar switch 301 are respectively associated with video image generator 107, 108, and 109 via the associated TV- and RV- conductors. It will thus be appreciated that upon the enabling of the select magnet associated with level SM0 and the enabling of the hold magnet associated with HM1 that the TV1 and RV1 leads of video image generator 107 will be extended through to the ATV1 and ARV1 conductors which extend to video trunk 102 thereby impressing any video signal present at the output of video image generator 107 on the TT and TR transmit leads of video trunk 102. Although only three horizontal levels are shown in FIG. 3, it will be obvious to those skilled in the art that in fact the remaining levels of crossbar switch 301 may be arranged and utilized in a similar fashion.

Proceeding now with the description, we shall assume that in a manner earlier set forth audio trunk 103 is enabled in response to a calling connection originating at the associated central office 112. Accordingly, relay (IN) is enabled in audio trunk 103 to record the existence of an incoming call. Circuitry not shown thereupon functions to bring about the extension of the call through to the PBX position S2 as earlier discussed. The enabling of make contact (IN-1) extends ground through release break contact (SA-2) and via the AT1 lead from audio trunk 103 to control circuit 106; from which point it is extended through released break contact 1 of hold magnet HMV1 to double transfer lockout circuit 302. Circuit 302 may comprise any number of configurations well known in the art operable to serve a plurality of input circuits such that in response to a ground signal on a corresponding input lead only one of a plurality of relays each associated with one of such circuits will be operated at one time. We shall further assume that no other circuits presently have ground extended to double transfer lockout circuit 302. Accordingly, relay TP1 operates at this time. The enabled state of relay TP1 partially completes the operate paths of selected magnets SELH0, SELH4, and SELH9 via make contacts TP2, TP3, and TP4, respectively. Referring now to FIG. 2, in response to the enabling of audio trunk 103 ground is extended to conductor OH1 via released break contacts (SA1) and HLD-2, and through enabled make contact (IN-4) to control circuit 106 and via enabled make contact TP1-2 to cause the operation of select magnet SELH0. The enabling of this select magnet closes off normal make contact 1 thereby extending ground through enabled make contact TP1-1 to cause the operation of hold magnet HMV1 at this time. Hold magnet HMV1 thereupon locks operated to the ground potential previously provided on conductor AT1 from audio trunk 103. The enabling of select magnet SELH0 and hold magnet HMV1 enables the crosspoint at the intersection of level SM0 and vertical unit HM1 in cross bar switch 301, thereby extending the TV1 and RV1 conductor from video image generator 107 through crossbar switch 301 to the ATV1 and ARV1 leads which extend to the TT and TR transmit leads of video trunk 102. As earlier recited, video image generator 107 provides a constant output operable to cause the visual presentation of a message as follows: "ABC Manufacturing Co." This output signal is thus extended to video set associated with station S1 to apprise that station of the status of the call.

Upon answer of the calling connection by attendant position S2, upon the enabling of attendant position circuit 110, relay (SA) operates in audio trunk 103. The enabling of break contact (SA-2) removes the locking ground extended to control circuit 106 thereby releasing hold magnet HMV1 and restoring the associated crosspoint in crossbar switch 301 to normal. As earlier recited, a continuous audio and video communication path now extends between calling station S1 and PBX attendant position S2.

When the attendant position S2 desires to place the incoming call on hold, the corresponding key (not shown) in attendant position circuit 110 is enabled and in a manner well known in the art results in ground being extended to the HLD lead of audio trunk 103 to thereby complete the obvious operate path of relay HLD. The enabled state of transfer contact HLD-1 inserts resistance 201 as a holding bridge between the T and R conductors extending back to the calling station. Concurrently therewith, the enabled state of make contact HLD-3 extends ground via lead AT1 as earlier described to cause the reoperation of relay TP1 in control circuit 106.

The enabled state of make contact HLD-2 extends ground via the HLD1 conductor to control circuit 106 where it is extended through enabled make contact TP1-3 to cause the operation of select magnet SELH4 thereby enabling horizontal level SM4 which is associated with video image generator 108.

The operating ground for select magnet SELH4 is extended through off normal make contact 1 of the select magnet through enabled make contact TP1-1 to reoperate hold magnet HMV1. As earlier described the operate state of transfer contacts HMV-1 thereupon locks the hold magnet operated to the ground provided on conductor AT1 from audio trunk 103 and concurrently opens the operate path of relay TP1 thereby releasing select magnet SELH4. The effect of the immediately aforedescribed circuit action is to close a crosspoint common to level SM4 and vertical unit HM1 in crossbar switch 301 thereby connecting video image generator 108 through to the transmit leads of video trunk 102 to thereby inform the calling station in a manner earlier discussed that "Your call has been placed on hold, the attendant will assist you momentarily."

We shall now assume that the attendant at position S2 reenables the connection through to the calling station by removing the hold condition. The release of relay HLD opens the previously described locking path provided on conductor AT1 to hold magnet HMV1 in control circuit 106. Communication, both visual and audible may now ensue between the attendant and the calling station.

Upon the attendant position S2 taking the necessary action to extend the call through to PBX station S3, the release key (not shown) is enabled in attendant position circuit 110. A linkage path is extended through PBX 101 from enabled video trunk 102 and enabled audio trunk 103 to PBX line circuit 111 which is associated with PBX station S3. In a manner set forth in detail in the cited Haas disclosure, make contact (RC-2) is enabled at this time and in conjunction with the released state of break contact (5F-1) extends ground from audio trunk 103 to cause the operation of the VSS relay in video trunk 102. As set forth in detail therein, the function of the VSS relay is to forward a video supervisory signal to the called video transceiver. This signal is transmitted concurrently with ringing of the call telephone subset. In the instant embodiment the ground signal is also extended through enabled make contact SA-3 to place ground on the RC1 conductor to control circuit 106. Concurrently therewith, the enabled state of make contact RC-1 provides ground on the AT1 conductor to control circuit 106 to cause the reoperation of relay TP1 as earlier described. The enabled state of make contact TP1-4 extends the ground present on the RC1 conductor from audio trunk 103 through to operate select magnet SELH9 at this time. Ground is thereupon extended from the operate path of select magnet SELH9 through its enabled off normal make contact 1 to reoperate hold magnet HMV1. As earlier described, the enabling of hold magnet HMV1 opens the operate path of relay TP1 thereby restoring the operated select magnet to normal.

The result of the immediate aforesaid circuit action is to close a crosspoint common to horizontal level SM9 and vertical unit HM1 to thereby associate video image generator 109 with the TT and TR transmit leads of video trunk 102. The result of this association is to cause a visual presentation at video subset S1A of the following statement: "Your party is being signaled; one moment, please." Upon answer of the call at station S3 relay (RC) releases thereby removing the holding ground for hold magnet HMV1 and thus restoring crossbar switch 301 to normal. Thus, at this time, video image generator 109 is no longer associated with video trunk 102 and the calling connection extends via separate but related video and audio paths between calling station S1 and called station S3. Accordingly, visual and audible communication may take place between the parties.

Although the foregoing description has been directed to the manner in which a calling station presently associated with video trunk 102 and audio trunk 103 is apprised of the various conditions encountered during the progress of a call, it will be obvious that other calling connections concurrently being served by PBX 101 will similarly be advised through the operation of control circuit 106. More specifically, it will be obvious that during the period video image generator 107 is associated with video trunk 102 it may also be simultaneously associated with video trunk 104 via closure of the crosspoint associated with vertical unit HM9 and horizontal level SM0; where required, suitable amplifying and equalizing apparatus may be provided in the video image generator circuit for this purpose.

It will also be obvious to those skilled in the art that although the foregoing description has been directed primarily to the transmission of visual information as to the status of the call, such visual information supplements and corroborates the audible signals well known in the art which accompany various calling conditions.

Although the embodiment of my invention discloses a private branch exchange switching system which is operable to advise a calling station both audibly and visually as to the status of the calling connection, it will be obvious to those skilled in the art that numerous other arrangements may be devised without departing from the spirit and scope of my invention.

For example, my invention may be applied to local, toll, and tandem switching centers so as to permit such centers to advise calling stations of the status of the calling connection by the transmission of video information selected in accordance with the condition encountered.

My invention may also be applied in an arrangement wherein a call is terminated to a called station, presently unattended, and wherein by previous arrangement visual information is transmitted therefrom indicating an attended station to which the call may subsequently be directed.

What is claimed is:

1. In a switching system, a plurality of stations each comprising video receiving means, an attendant position comprising video transmitting means having a connection established to one of said stations, means controlled by said position for extending said connection to another of said stations, a plurality of sources of video information, and means controlled by said extending means or connecting selected ones of said sources in sequence to said attendant position transmitting means thereby visually informing said one station of the progress of said connection.

2. In a video-telephone communication system, a plurality of stations each comprising video transmitting and receiving means and telephone transmitting and receiving means, video trunk means for extending a video communication path from a first one of said stations to another of said stations, audio trunk means for extending a telephone communication path from said first station to said other station comprising supervisory signal indicating means, means for monitoring said audio trunk supervisory signal indicating means, means controlled by said monitoring means for detecting the occurrence of certain conditions, a plurality of sources of video signals each operable to transmit information identifying one of said conditions, and switch means controlled by said detecting means for connecting selected ones of said sources in sequence to said video trunk means.

3. In a video-telephone communication system, an attendant position, a plurality of stations each comprising video transmitting and receiving means and telephone transmitting and receiving means, trunk means for extending a video and a telephone communication path from each of said stations to said attendant position, means for monitoring said trunk means, means controlled by said monitoring means for detecting each extension of said video and telephone communication path to said position, a source of video signals operable to transmit information indicating said extension, and means controlled by said detecting means for connecting said source to said trunk means.

4. In a video-telephone communication system the combination set forth in claim 3 wherein said attendant position comprises other video and audio transmitting and receiving means and means for further extending said communication path to said other video and audio transmitting and receiving means, said detecting means further comprising means controlled by said monitoring means for detecting the enabling of said further extending means, and means controlled by said detecting means for releasing said connecting means.

5. In a video-telephone communication system the combination set forth in claim 4 wherein said attendant position comprises means for establishing a hold condition on said further extended communication path, said detecting means further comprising means controlled by said monitoring means for detecting the enabling of said establishing means, another source of video signals operable to transmit information indicating the enabling of said establishing means, and means controlled by said detecting means for connecting said other source to said trunk means.

6. In a video-telephone communication system the combination set forth in claim 5 wherein said attendant position further comprises means for releasing said establishing means, said detecting means further comprising means controlled by said monitoring means for detecting the release of said establishing means, and means controlled by said detecting means for releasing said other source from said trunk means.

7. In a video-telephone communication system comprising a plurality of stations each comprising video transmitting and receiving means and telephone transmitting and receiving means, means for extending a calling video communication path from a first said station to another of said stations, and means for extending a calling telephone communication path from said first station to said other station;

means for visually informing said first station of the status of said calling communication paths comprising means common to all said stations for monitoring the said extending of said telephone communication path, means controlled by said monitoring means for detecting the occurrence of certain conditions occurring during the functioning of said telephone communication path extending means, a plurality of sources of video information, and switch means controlled by said detecting means for connecting selected ones of said sources in sequence to said video communication path.

* * * * *